United States Patent
Hiekata et al.

(10) Patent No.: US 10,189,687 B2
(45) Date of Patent: Jan. 29, 2019

(54) ELECTRIC WINCH DEVICE AND MOBILE CRANE

(71) Applicants: Kobe Steel, Ltd., Kobe-shi (JP); KOBELCO CONSTRUCTION MACHINERY CO., LTD., Hiroshima-shi (JP)

(72) Inventors: Takashi Hiekata, Kobe (JP); Hiroaki Kawai, Kobe (JP); Koji Inoue, Kobe (JP); Shintaro Sasai, Hyogo (JP); Tetsuya Ogawa, Hyogo (JP); Toshiro Yamashita, Hyogo (JP)

(73) Assignees: Kobe Steel, Ltd., Kobe-shi (JP); KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/532,821

(22) PCT Filed: Nov. 27, 2015

(86) PCT No.: PCT/JP2015/083341
§ 371 (c)(1),
(2) Date: Jun. 2, 2017

(87) PCT Pub. No.: WO2016/088662
PCT Pub. Date: Jun. 9, 2016

(65) Prior Publication Data
US 2017/0362067 A1    Dec. 21, 2017

(30) Foreign Application Priority Data

Dec. 5, 2014  (JP) .................................. 2014-246741

(51) Int. Cl.
*B66D 1/12* (2006.01)
*B66D 1/16* (2006.01)
(Continued)

(52) U.S. Cl.
CPC .................. *B66D 1/12* (2013.01); *B66D 1/16* (2013.01); *F16H 1/20* (2013.01); *B66C 23/36* (2013.01); *B66C 2700/0371* (2013.01)

(58) Field of Classification Search
CPC .... B66D 1/12; B66D 1/16; F16H 1/20; B66C 2700/0371
See application file for complete search history.

(56) References Cited

U.S. PATENT DOCUMENTS 2,271,428 A * 1/1942 Harry ........................ B66C 7/00
                                                        212/274
2,345,662 A * 4/1944 Fox .......................... B66D 1/26
                                                        254/340
(Continued)

FOREIGN PATENT DOCUMENTS

JP   2005-47717 A    2/2005
JP   2005-263420 A   9/2005
(Continued)

OTHER PUBLICATIONS

International Search Report dated Feb. 9, 2016 in PCT/JP2015/083341 filed Nov. 27, 2015.
(Continued)

*Primary Examiner* — Michael E Gallion
(74) *Attorney, Agent, or Firm* — Oblon, McClelland, Maier & Neustadt, L.L.P.

(57) ABSTRACT

An electric winch device causes an operative part to perform an operation for hoisting work by winding up or letting out a rope connected to the operative part, the electric winch device including: a winch drum having an axis, provided on the mobile crane to be rotatable about the axis and wound with the rope therearound; a plurality of motors located on one side of the winch drum in an axial direction in which the axis of the winch drum extends, and arranged side by side in a direction perpendicular to the axial direction; a gear
(Continued)

mechanism which combines torques output from the plurality of motors; and a transmitting part which transmits a resultant of torques combined by the gear mechanism to the winch drum to rotate the winch drum to thereby cause the winch drum to wind up or let out the rope.

6 Claims, 12 Drawing Sheets

(51) Int. Cl.
*F16H 1/20* (2006.01)
*B66C 23/36* (2006.01)

(56) References Cited

U.S. PATENT DOCUMENTS

| | | | | |
|---|---|---|---|---|
| 3,757,524 | A * | 9/1973 | Poyner | F16H 61/44 60/406 |
| 4,328,954 | A * | 5/1982 | Logus | B66D 1/44 192/18 A |
| 2002/0171072 | A1* | 11/2002 | Tso-Kuo | B66D 1/12 254/345 |
| 2005/0133773 | A1* | 6/2005 | Heinrichs | B66D 5/14 254/363 |
| 2006/0261205 | A1* | 11/2006 | Zhang | B66D 1/14 242/396.5 |
| 2008/0001132 | A1* | 1/2008 | Huang | B66D 1/12 254/362 |
| 2008/0019815 | A1* | 1/2008 | Harris | B66C 23/80 414/563 |
| 2010/0224844 | A1* | 9/2010 | Boussaton | B66D 1/26 254/290 |
| 2010/0242824 | A1* | 9/2010 | Karlsson | B66D 1/7426 114/268 |
| 2011/0193037 | A1* | 8/2011 | Smith | B66D 1/38 254/336 |
| 2012/0152878 | A1* | 6/2012 | Ishihara | B66C 23/365 212/280 |
| 2014/0284108 | A1* | 9/2014 | Pendleton | E21B 19/008 175/57 |
| 2015/0083985 | A1* | 3/2015 | Lervik | B63B 21/22 254/340 |
| 2015/0284227 | A1* | 10/2015 | Hall | B66D 1/485 254/266 |
| 2016/0257534 | A1* | 9/2016 | Kawai | B66C 13/50 |
| 2016/0289054 | A1* | 10/2016 | Hiekata | B66D 1/46 |
| 2017/0210606 | A1* | 7/2017 | Kawai | B60T 8/17 |
| 2017/0297876 | A1* | 10/2017 | Holck | E21B 19/09 |

FOREIGN PATENT DOCUMENTS

JP  2008-247583 A  10/2008
WO  WO 2013/147613 A1  10/2013

OTHER PUBLICATIONS

Extended European Search Report dated Nov. 7, 2017 in Patent Application No. 15866011.8, 7 pages.
European Office Action dated Oct. 11, 2018 in European Patent Application No. 15866011.8, 4 pages.
Ogura Industrial Corporation: Jan. 18, 2013 (Jan. 18, 2013), 1 page.

* cited by examiner

ELECTRIC WINCH DEVICE AND MOBILE CRANE

TECHNICAL FIELD

The present invention relates to an electric winch device and a mobile crane.

BACKGROUND ART

Conventionally, a mobile crane is mounted with a winch device driven by a hydraulic actuator such as a hydraulic motor to perform a hoisting work of raising or lowering a hoisted load by the winch device.

Also, it has been proposed to mount an electric winch device using an electric actuator having a greater energy efficiency than the hydraulic actuator on a crane for energy saving. For example, it has been proposed to mount an electric winch device on a tower crane to be fixedly installed on a floor base of a building under construction for a crane operation. Patent Literature 1 shows a climbing crane as an example of the tower crane.

The climbing crane disclosed in Patent Literature 1 includes an electric winch device having a winch drum and two motors to drive the drum. In the electric winch device, the two motors are arranged on the opposite sides of the winch drum in an axial direction of the winch drum in order to prevent occurrence of a twist at a local portion of an input shaft or a body of the winch drum, and torques are input from the respective motors on the opposite sides to the winch drum.

Although the electric winch device of Patent Literature 1 has an advantage that a sufficient hoisting performance can be assured by rotating the winch drum by a torque output from the two motors, it is difficult to mount the electric winch device on a mobile crane in terms of a dimensional restriction for the mobile crane. The reason for the difficulty will be described below.

In a mobile crane, a winch device is mounted on an upper slewing body. The upper slewing body will involve a dimensional limitation when the upper slewing body is transported or the mobile crane runs on a public road.

Specifically, the upper slewing body is placed in a transportation vehicle such as a trailer for transportation of the mobile crane. In this case, normally, the upper slewing body is placed in such manner that the width direction of the upper slewing body is along the width direction of the transportation vehicle. The transportation vehicle runs on a public road, and hence is required to satisfy a statutory regulated vehicle width restriction. Accordingly, the width of the upper slewing body is also limited in accordance with the vehicle width restriction. In the case that the upper slewing body is mounted with the winch device of Patent Literature 1, which is provided with two motors on the opposite sides of the winch drum in the axial direction of the winch drum, in the arrangement that the axial direction of the winch drum is along the width direction of the upper slewing body, the electric winch device has an increased dimension in the axial direction of the winch drum. Therefore, it is difficult to mount the electric winch device on the upper slewing body because of the above-described width limitation of the upper slewing body.

Moreover, when a mobile crane runs on a public road, the mobile crane is required to satisfy the vehicle width restriction. The upper slewing body is arranged in such a manner that the width direction of the upper slewing body is along the vehicle width direction of the mobile crane, when the mobile crane runs on a public road. Hence, the width of the upper slewing body is limited in accordance with the vehicle width restriction in this case as well. Therefore, it is also difficult to mount the electric winch device of Patent Literature 1 on the upper slewing body.

CITATION LIST

Patent Literature

Japanese Unexamined Patent Publication No. 2005-263420

SUMMARY OF INVENTION

An object of the present invention is to provide an electric winch device and a mobile crane which can assure a sufficient hoisting performance and satisfy the dimensional restriction for the mobile crane.

An electric winch device according to one aspect of the present invention is an electric winch device which is to be mounted on a mobile crane including an operative part for hoisting work to cause the operative part to perform an operation for the hoisting work by winding up or letting out a rope connected to the operative part, the electric winch device comprising: a winch drum having an axis, the winch drum being provided on the mobile crane to be rotatable about the axis and being wound with the rope therearound; a plurality of motors located on one side of the winch drum in an axial direction in which the axis of the winch drum extends, and arranged side by side in a direction perpendicular to the axial direction of the winch drum; a gear mechanism which combines torques output from the plurality of motors; and a transmitting part which transmits a resultant of torques combined by the gear mechanism to the winch drum to rotate the winch drum to thereby cause the winch drum to wind up or let out the rope.

Furthermore, a mobile crane according to another aspect of the present invention includes the electric winch device according to the one aspect.

DESCRIPTION OF EMBODIMENTS

Hereinafter, embodiments of the present invention will be described with reference to the accompanying drawings.

First Embodiment

An electric winch device 1 according to a first embodiment of the present invention and a mobile crane including the same will be described with reference to FIGS. 1 to 4.

Figure 1:
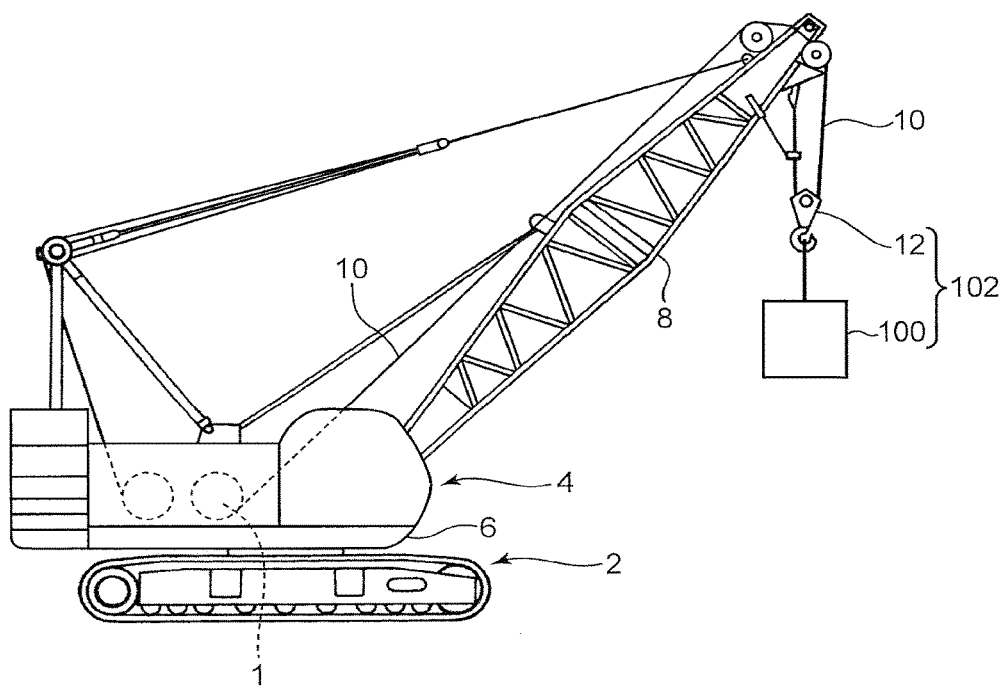
FIG. 1 is a schematic side view illustrating a mobile crane which is mounted with an electric winch device of the winding type according to a first embodiment of the present invention.

FIG. 1 illustrates an exemplary mobile crane which is mounted with the electric winch device 1 according to the first embodiment 1. The mobile crane is a crawler crane. The mobile crane includes a lower travelling body 2 of the self-running crawler type, and an upper slewing body 4 mounted on the lower travelling body 2.

The upper slewing body 4 includes a slewing frame 6, a boom 8, and a hook device 12. The slewing frame 6 is mounted on the lower traveling body 2 slewably about a vertical axis. The boom 8 is attached to a front portion of the slewing frame 6 and movable up and down. The hook device 12 is hanged from the top end of the boom 8 via a hoist rope 10 made of wires to hang a hoisted load 100. The hook device 12 is an example of the operative part for hoisting work according to the present invention. Hereinafter, for some cases, the hook device 12 and the hoisted load 100 are combinedly referred to as a target object 102 to be raised and lowered.

Hereinafter, it should be noted that the words "front" and "rear" used in the description respectively mean the "front" and the "rear" of the upper slewing body 4 or the slewing frame 6. The term "front side" of the slewing body 4 means one side where the boom 8 is located, and the term "rear side" of the slewing body 4 means the other side that is opposite to the one side where the boom 8 is located. Furthermore, a width direction of the upper slewing body 4 is a direction perpendicular to both a front and rear direction, and an axial direction of a slewing axis of the upper slewing body 4.

Figure 2:
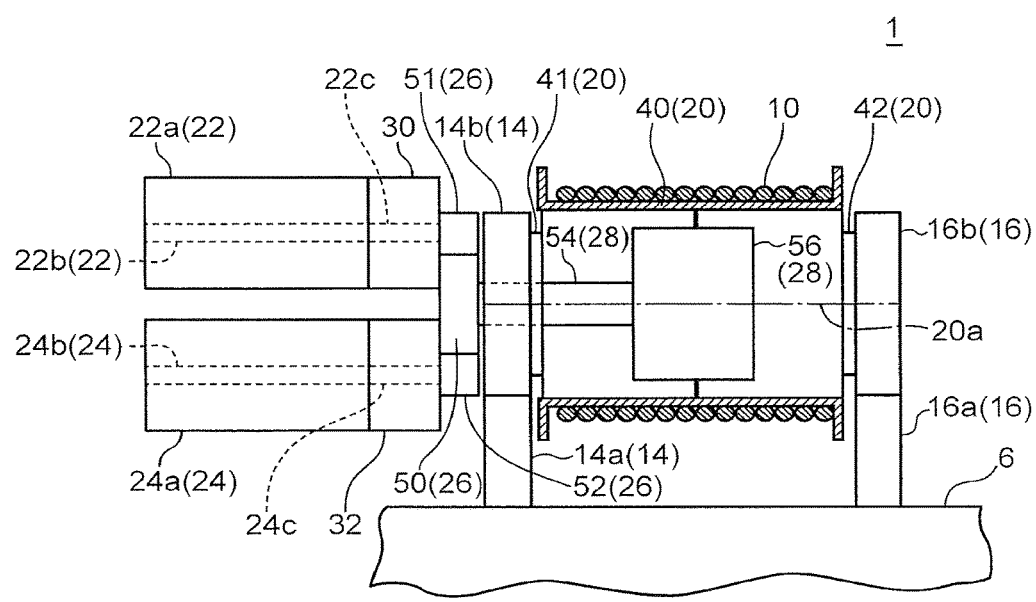
FIG. 2 is a schematic view illustrating the electric winch device according to the first embodiment that is mounted on a slewing frame.

As illustrated in FIG. 2, the slewing frame 6 bears a first standing support 14 and a second standing support 16 thereon to support a winch drum 20 to be described later. The first standing support 14 and the second standing support 16 are disposed in an intermediate position in the front and rear direction of the slewing frame 6, and behind the attachment position of the boom 8 on the slewing frame 6 (see FIG. 1). The first standing support 14 and the second standing support 16 face each other at a distance therebetween in the width direction of the slewing frame 6.

As illustrated in FIG. 2, the first standing support 14 has a first base part 14a fixedly attached to the slewing frame 6, and a first bearing part 14b retained by the first base part 14a. The second standing support 16 has a second base part 16a fixedly attached to the slewing frame 6, and a second bearing part 16b retained by the second base part 16b.

Figure 3:
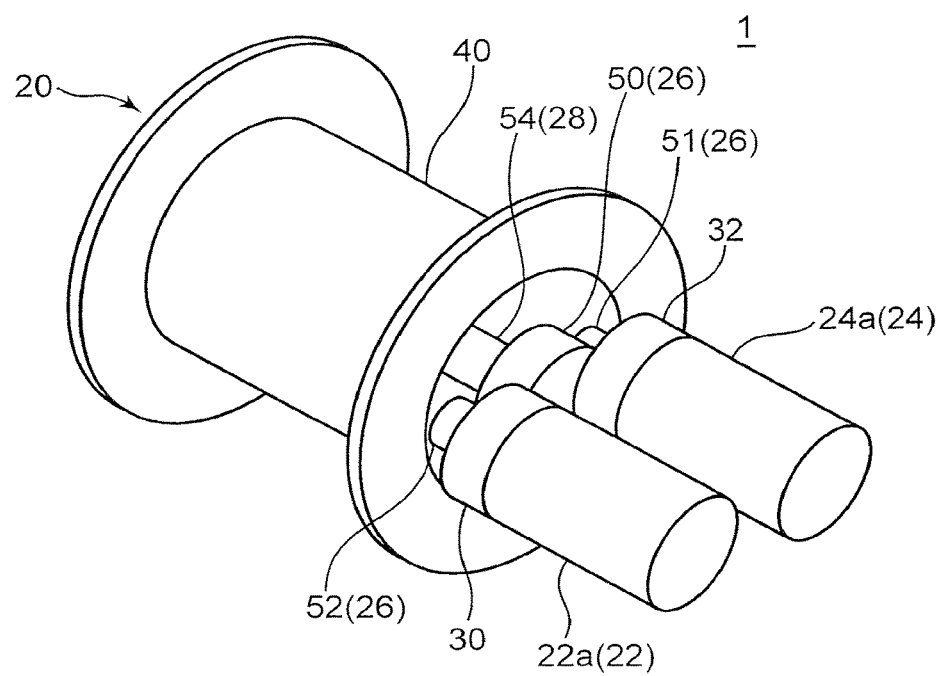
FIG. 3 is a schematic perspective view illustrating the electric winch device according to the first embodiment, which is seen from a side where motors and a gear mechanism are disposed.

The electric winch device 1 is mounted on the upper slewing body 4 (see FIG. 1). The electric winch device 1 is arranged behind the attachment position of the boom 8 on the slewing frame 6. The electric winch device 1 is a winch device for winding which winds up or lets out the hoist rope 10 connected to the hook device 12 to thereby cause the hook device 12 to move upward or downward for the hoisting work. As illustrated in FIGS. 2 and 3, the electric winch device 1 includes a winch drum 20 (hereinafter, referred to as "drum 20"), a first motor 22, a second motor 24, a gear mechanism 26, a transmitting part 28, a first brake 30, and a second brake 32.

The drum 20 is wound with the hoist rope 10 therearound, and is rotated to wind up and let out the hoist rope 10, thereby raising and lowering the hook device 12 (FIG. 1). In other words, the drum 20 is rotated to wind up and let out the hoist rope 10, thereby raising and lowering the target object 102. The drum 20 has an axis 20a about which the drum 20 rotates, and is supported by the first standing support 14 and the second standing support 16 in such a manner that an axial direction of the drum 20 in which the axis 20a lies is along the width direction of the upper slewing body 4. In this manner, the drum 20 is provided on the slewing frame 6. As illustrated in FIG. 2, the drum 20 has a drum body 40, a first shaft 41, and a second shaft 42. Also, FIG. 2 illustrates a cross sectional view of the drum body 40 and the hoist rope 10 that is taken along the axis of the drum body 40 in order to show an inside of the drum body 40.

The drum body 40 serves to wind the hoist rope 10 thereon. The hoist rope 10 is pulled out from the drum body 40, passes through the top end of the boom 8 (see FIG. 1), and extends therefrom to hang the hook device 12. The drum body 40 is in the cylindrical shape, and has flanges at the axially opposite ends thereof. The axis 20a agrees with an axis of the cylindrical drum body 30. The drum body 40 has a space in the inside thereof.

The first shaft 41 (see FIG. 2) is fixedly attached to one axial end of the drum body 40 and rotatable integrally with the drum body 40. The first shaft 41 extends outward from the one axial end of the drum body 40, and is coaxial with the drum body 40.

The second shaft 42 (see FIG. 2) is fixedly attached to the other axial end of the drum body 40 and rotatable integrally with the drum body 40. The second shaft 42 extends outward from the other axial end of the drum body 40, and is coaxial with the drum body 40.

The first shaft 41 is rotatably supported by the first bearing part 14b, and the second shaft 42 is rotatably supported by the second bearing part 16b in the state that the drum body 40 is arranged between the first standing support 14 and the second standing support 16. In this way, the drum 20 is disposed over the upper slewing body 4 of the mobile crane while being rotatable about the axis 20a that is along the width direction of the upper slewing body 4. The drum 20 is rotated in a wind-up direction which is one of the rotational directions to wind up the hoist rope 10 on the drum body 40 to thereby raise the hook device 12 (see FIG. 1) to raise the target object 102. Also, the drum 20 is rotated in a let-out direction which is the opposite rotational direction to the wind-up direction to let out the hoist rope 10 to thereby lower the hook device 12 to lower the target object 102.

The first motor 22 and the second motor 24 are activated by electric power supply, and output torques to rotate the drum 20 in the wind-up direction to raise the target object 102. As illustrated in FIG. 2, the first and second motors 22, 24 are located on one side of the drum 20 in the axial direction of the drum 20 over the upper slewing body 4 of the mobile crane. Specifically, the first and second motors 22, 24 are arranged on one side of the first standing support 14, in the axial direction of the drum 20, that is opposite to the other side of the first standing support 14 where the drum body 40 lies.

The first motor 22 has a first motor body 22a and a first drive shaft 22b. The first motor 22a is activated by power supply to thereby cause the first drive shaft 22a to rotate about the axis thereof, and serves as a driving device. Specifically, the first drive shaft 22b rotates owing to the activation of the first motor 22a. The first drive shaft 22b is a shaft for outputting the torque generated by the first motor body 22a. In other words, the first drive shaft 22b serves as an output shaft for the torque of the first motor 22. Referring to the first motor 22, the first motor body 22a is supported by an unillustrated motor support provided on the slewing frame 6 while keeping the first drive shaft 22b lying along the axial direction of the drum 20. The first drive shaft 22b has an extension 22c (FIG. 2) protruding from the first motor body 22a toward the first standing support 14. The first drive shaft 22b is connected to the gear mechanism 26.

The second motor 24 has a second motor body 24a and a second drive shaft 24b. The second motor body 24a is activated by power supply to thereby cause the second drive shaft 24b to rotate about the axis thereof, and serves as a driving device. Specifically, the second drive shaft 24b rotates owing to the activation of the second electric body 24a. The second drive shaft 24b is a shaft for outputting the torque generated by the second electric body 24a. In other words, the second drive shaft 24b serves as an output shaft for the torque of the second motor 24. Referring to the second motor 24, the second electric motor body 24a is supported by an unillustrated motor support provided on the slewing frame 6 while keeping the second drive shaft 24b lying along the axial direction of the drum 20. Also, the second motor 24 is arranged side by side with the first motor 22 in a direction perpendicular to the axial direction of the drum 20 and the second drive shaft 24b extends in parallel to the first drive shaft 22b. The second drive shaft 24b has an extension 24c (see FIG. 2) protruding from the second motor body 24 toward the first standing support 14.

The gear mechanism 26 combines the torque output from the first motor 22 and the torque output from the second motor 24. In other words, the gear mechanism 26 combines the torque of the first drive shaft 22b and the torque of the second drive shaft 24b. The gear mechanism 26 is arranged between the first and second motors 22, 24, and the first standing support 14. In other words, the gear mechanism 26 is arranged on one side of the first standing support 14, in the axial direction of the drum 20, that is opposite to the other side of the first standing support 14 where the drum body 40 lies.

As illustrated in FIGS. 2 and 3, the gear mechanism 26 has a center gear 50, a first gear 51, and a second gear 52. Each of the gears 50, 51, 52 has external teeth. FIGS. 2 and 3 schematically illustrate the gears 50, 51, 52, and thus the external teeth of each of the gears are unillustrated. Moreover, in FIG. 3, the first shaft 41, the first bearing part 14b and the like of the drum 20 are not fully illustrated from the perspective of easy understanding of the arrangement of the first gear 51 and the second gear 52 with respect to the center gear 50, and a transmission shaft 54 coupled to the center gear 50 to be described later. The above-described non-illustration is applied to FIGS. 5 and 7 to 11 which refer to another embodiment and modifications to be described later.

The center gear 50 is an example of the outputting member according to the present invention. The center gear 50 is coaxial with the drum 20. The first gear 51 is coaxial with the first drive shaft 22b (see FIG. 2), and is coupled thereto to rotate integrally therewith. Specifically, the first gear 51 is coupled to a leading end of the extension 22c of the first drive shaft 22b. The second gear 52 is coaxial with the second drive shaft 24b (see FIG. 2), and is coupled thereto to rotate integrally therewith. Specifically, the second gear 52 is coupled to a leading end of the extension 24c of the second drive shaft 24b.

As illustrated in FIG. 3, the first gear 51 and the second gear 52 are arranged around the center gear 50. Specifically, the first gear 51 and the second gear 52 are arranged on radially one outside and radially the opposite outside of the center gear 50. The first gear 51 and the second gear 52 mesh with the center gear 50. In this configuration, the torque of the first drive shaft 22b is transmitted from the first gear 51 to the center tear 50, and the torque of the second drive shaft 24b is transmitted from the second gear 52 to the center gear 50. In this manner, the torques of the drive shafts 22b, 24b are combined with each other. In other words, the center gear 50 is rotated owing to a resultant of torques of the drives shafts 22b, 24b that are combined with each other.

The first gear 51 has the same configuration as the second gear 52. Each of the first gear 51 and the second gear 52 has a smaller radius and a smaller number of teeth than the center gear 50. In this configuration, the center gear 50 has a lower rotational speed than the first and second gears 51, 52. On the other hand, the torque of the center gear 50 corresponds to the resultant of torques from the first and second gears 51, 52 that are combined with each other, and hence is greater than each of the torques from the first and second gears 51, 52. Accordingly, the gear mechanism 26 generates a greater toque than each of the torques of the first and second drive shafts 22, 24b.

The transmitting part 28 (see FIG. 2) transmits the resultant of torques combined by the gear mechanism 26 to the drum 20, thereby rotating the drum 20 to wind up or let out the hoist rope 10. As illustrated in FIG. 2, the transmitting part 28 has the transmission shaft 54 and a speed reducer 56.

The transmission shaft 54 extends from the center gear 50 to the inside of the drum body 40 through the first shaft 41. The transmission shaft 54 is coaxial with the center gear 50, and integrally rotatable therewith about the same axis. Furthermore, the transmission shaft 54 is coaxial and the drum 20. The transmission shaft 54 is rotatable relative to the first shaft 41 of the drum 20.

The speed reducer 56 is arranged in the inside of the drum body 40. The speed reducer 56 has an input portion connected with the transmission shaft 54, and an output portion connected to the drum body 40. When receiving an input of the rotation of the transmission shaft 54, the speed reducer 56 rotates the drum 20 at a rotational speed to which the rotational speeds of the center gear 50 and the transmission shaft 54 have been reduced at a predetermined speed reduction ratio. Furthermore, the speed reducer 56 increases the torque input from the transmission shaft 54. In this manner, the transmitting part 28 increases the torque input from the center gear 50 of the gear mechanism 26 while transmitting the torque to the drum body 40.

The first brake 30 (see FIG. 2) brakes the rotation of the drum 20 connected to the first drive shaft 22b via the gear mechanism 26 and the transmitting part 28 by applying a braking force to the first drive shaft 22b of the first motor 22.

For example, an electromagnetic brake constitutes the first brake 30. The first brake 30 is arranged closer to the first standing support 14 than the first motor body 22a, i.e., arranged between the first motor body 22a and the gear mechanism 26, and fixedly attached to the first motor body 22a. The first brake 30 surrounds the extension 22c of the first drive shaft 22b, and applies the braking force to the extension 22c.

The second brake 32 (see FIG. 2) brakes the rotation of the drum 20 connected to the second drive shaft 24b via the gear mechanism 26 and the transmitting part 28 by applying a braking force to the second drive shaft 24b of the second motor 24. An electromagnetic brake constitutes the second brake 32, like the first brake 30. The second brake 32 is arranged closer to the first standing support 14 than the second motor body 24a, i.e., between the second motor body 24a and the gear mechanism 26, and fixedly attached to the second motor body 24a. The second brake 32 surrounds the extension 24c of the second drive shaft 24b, and applies the braking force to the extension 24c.

Figure 4:
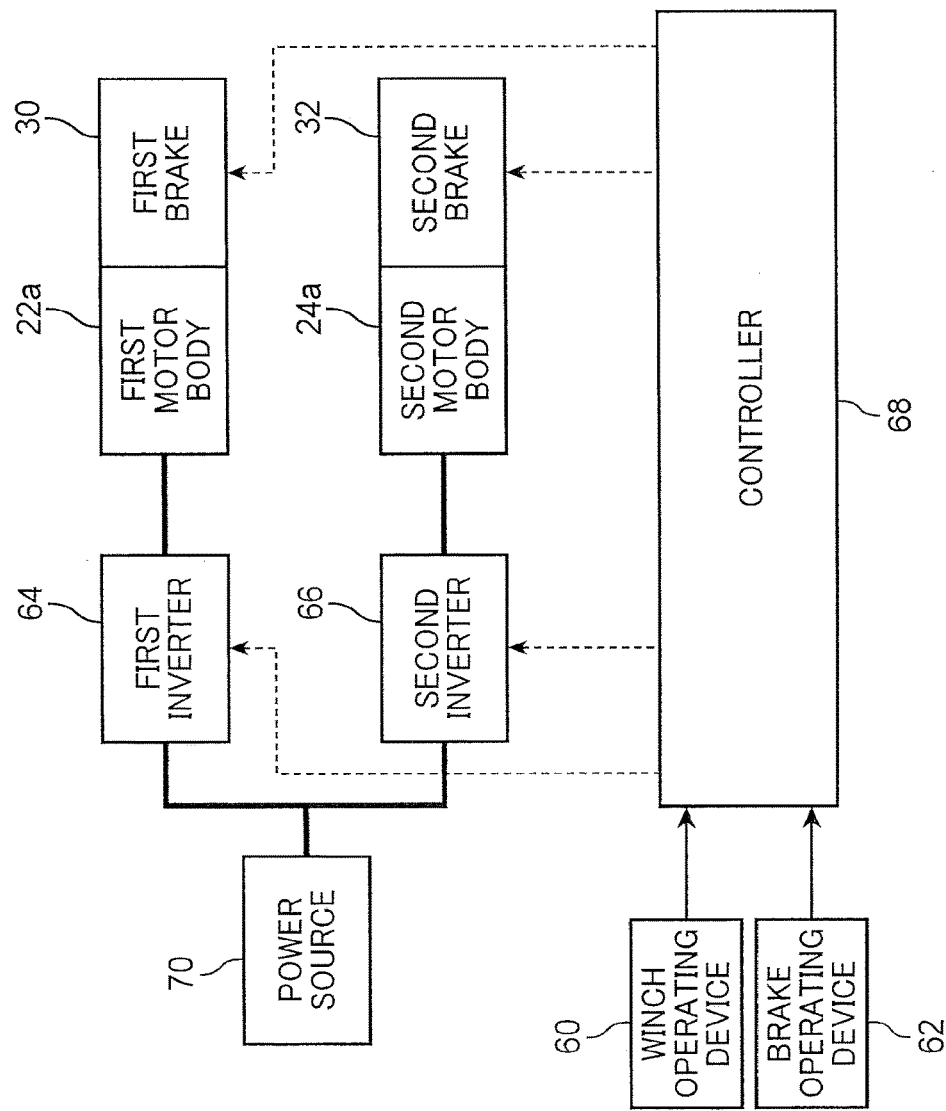
FIG. 4 is a functional block diagram showing a control system for controlling the motors and brakes of the electric winch device mounted on the mobile crane.

A control system for controlling the first and second motors 22, 24, and the first and second brakes 30, 32 as shown in FIG. 4 is provided on the mobile crane. The control system includes a winch operating device 60, a brake operating device 62, a first inverter 64, a second inverter 66, and a controller 68.

The winch operating device 60 is used to perform an operation to rotate the drum 20 (see FIG. 2) in the wind-up or let-out direction. The winch operating device 60 has an unillustrated operative lever, and outputs an instruction signal in response to an operation of the operative lever to the controller 68.

The brake operating device 62 is used to operate the first brake 30 and the second brake 32. The brake operating device 62 has an unillustrated pedal, and outputs an instruction signal in response to an operation of the brake pedal to the controller 68.

The first inverter 64 controls an electric current supplied from a power source 70 to the first motor body 22a.

The second inverter 66 controls an electric current supplied from the power source 70 to the second motor body 24a.

In response to the instruction signal input from the winch operating device 60, the controller 68 controls the first inverter 64 and the second inverter 66 to cause an electric current in accordance with the instruction signal indicative of the operation of the operative lever to flow into the first motor body 22a and the second motor body 24a. In this manner, the controller 68 controls the activation of the first and second motors 22, 24 in order to rotate the drum 20 in the wind-up or let-out direction in accordance with the operation of the operative lever. Further, in response to the instruction signal input from the brake operating device 62, the controller 68 also controls each of the first and second brakes 30, 32 to apply a braking force in accordance with the instruction signal indicative of an operation of the brake pedal.

In the electric winch device 1 of the first embodiment, the gear mechanism 26 combines the torque of the first drive shaft 22b of the first motor 22 and the torque of the second drive shaft 24b of the second motor 24, and the transmitting part 28 transmits the resultant of torques combined by the gear mechanism 26 to the winch drum 20. Therefore, it is possible to rotate the drum 20 by a sufficient torque. Accordingly, the electric winch device 1 and the mobile crane including the same can assure a sufficient hoisting performance.

Also, in the first embodiment, the first and second motors 22, 24 are arranged on the one side of the drum 20 in the axial direction of the drum 20, and arranged side by side in a direction perpendicular to the axial direction of the drum 20. Hence, the dimension of the electric winch device 1 in the axial direction of the drum 20 can be reduced in comparison with an assumed case where a first motor 22 and a second motor 24 are arranged on the opposite sides of the drum 20 in the axial direction of the drum 20. Accordingly, when the electric winch device 1 is mounted on the upper slewing body 4 in such a manner that the axial direction of the drum 20 is along with the width direction of the upper slewing body 4, it is possible to satisfy the width limitation of the upper slewing body 4.

Besides, in the first embodiment, the transmitting part 28 which has the speed reducer 56 makes it possible to rotate the drum 20 at a lower rotational speed than the center gear 50 of the gear mechanism 26. Further, in the first embodiment, the size of the electric winch device 1 can be reduced owing to the arrangement of the speed reducer 56 in the inside of the drum body 40 in comparison with a case where a speed reducer 56 is arranged outside the drum 20.

Furthermore, in the first embodiment, the first brake 30 applies the braking force to the first drive shaft 22b of the first electric motor 22, and the second brake 32 applies the braking force to the second shaft 24b of the second motor 24. In this manner, it is possible to brake the rotation of the drum 20.

Moreover, in the first embodiment, even if one of the first brake 30 and the second brake 32 cannot generate the braking force due to a failure, the other brake can keep the braking force to brake the rotation of the drum 20. Therefore, it is possible to ensure an increased reliability in the braking of the rotation of the drum 20.

Additionally, in the first embodiment of the present invention where the first brake 30 applies the braking force to the first drive shaft 22b of the first motor 22, and the second brake 32 applies the braking force to the second drive shaft 24b, the first and second brakes 30, 32 can sufficiently brake the rotation of the drum 20 at their respective small braking forces.

Specifically, the gear mechanism 26 and the speed reducer 56 transmit the torques of the drive shafts 22b, 24b of the motors 22, 24 to the drum 20 after increments. The brakes 30, 32 apply the braking forces to the respective drive shafts 22b, 24b of the motors 22, 24 which are located at a starting position of a torque transmission sequence. Hence, the brakes 30, 32 can brake the rotation of the drum 20 at smaller braking forces. In other words, it is sufficient for the brakes 30, 32 to generate smaller braking forces to brake the rotation of the drum 20. This makes it possible to use the brakes 30, 32 each having a smaller size and a smaller braking capability, and thus can prevent an increase in the size of the electric winch device 1 due to the provision of the brakes 30, 32.

Second Embodiment

Figure 5:
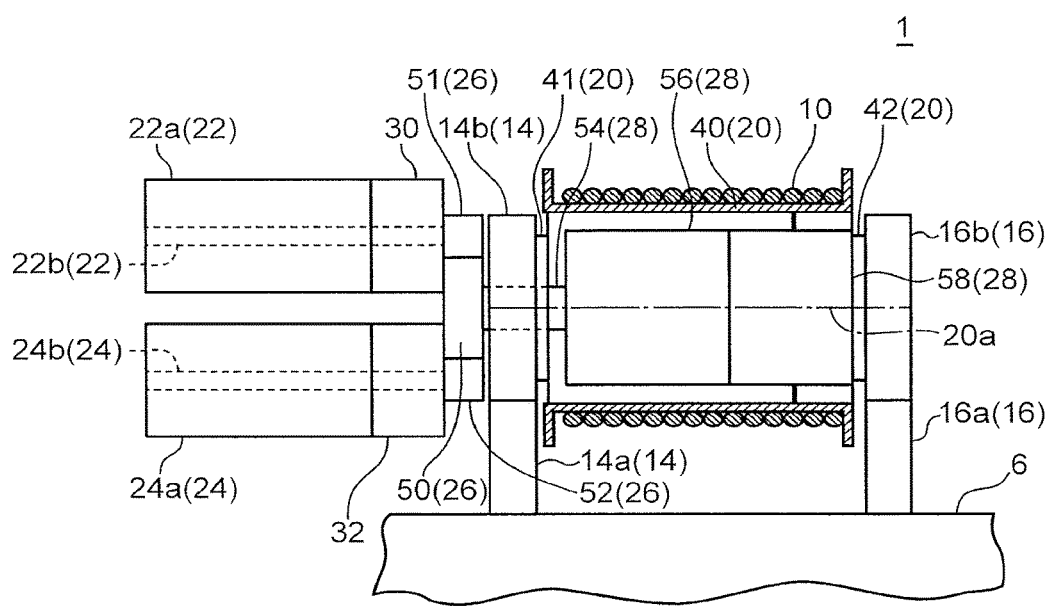
FIG. 5 is a view illustrating an electric winch device according to a second embodiment of the present invention, similar to FIG. 2.
Figure 6:
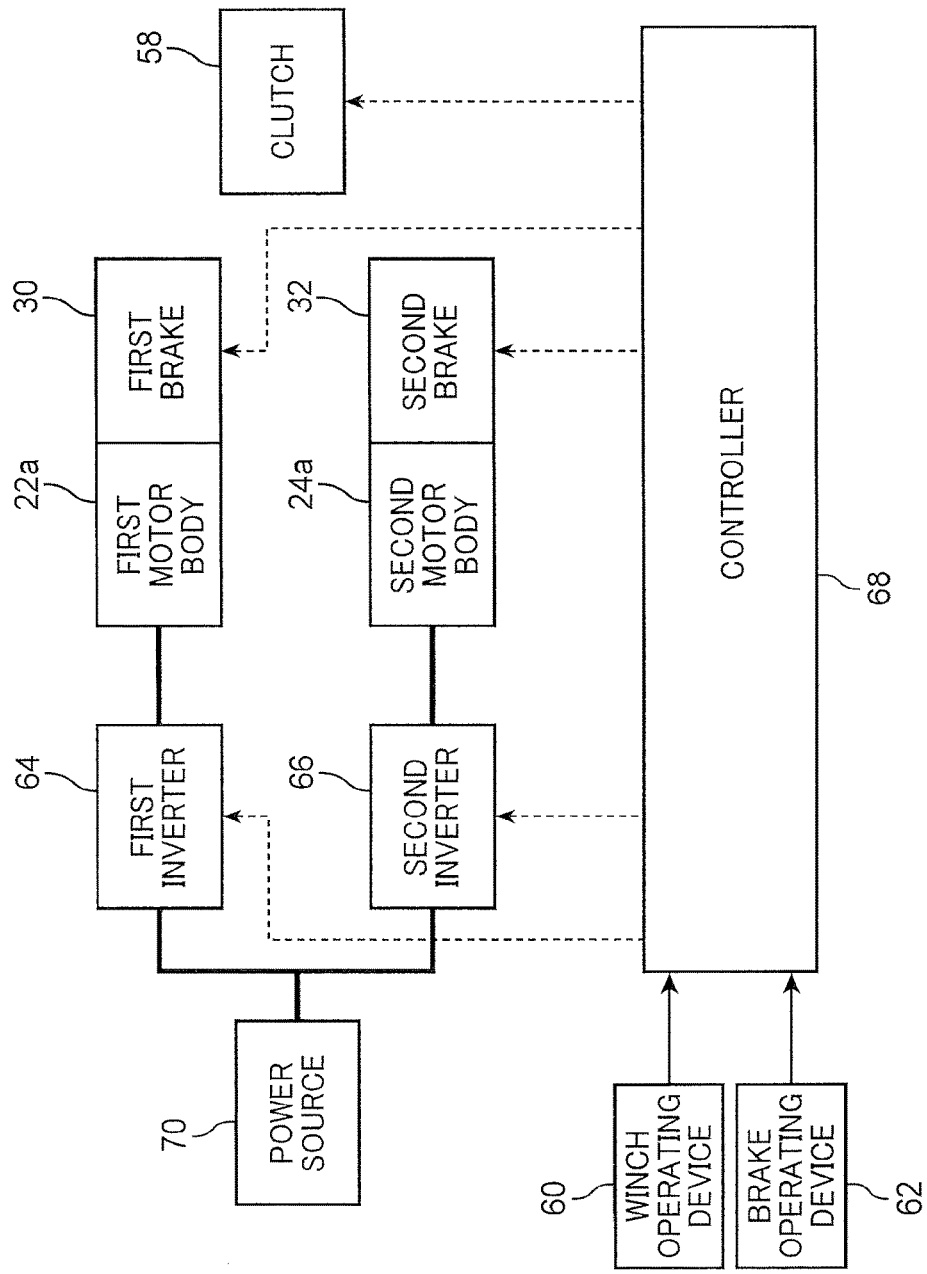
FIG. 6 is a functional block diagram showing a control system for controlling motors and brakes of the electric winch device according to the second embodiment.

FIG. 5 schematically illustrates a configuration of an electric winch device 1 according to a second embodiment of the present invention. FIG. 6 shows a configuration of a control system to control the electric winch device 1 according to the second embodiment. The electric winch device 1 according to the second embodiment will be described with reference to FIGS. 5 and 6.

The electric winch device 1 according to the second embodiment is to be mounted on a mobile crane, and is used to perform an operation of raising and lowering a target object 102 (see FIG. 1) in the same manner as the electric winch device 1 according to the first embodiment. However, the electric winch device 1 according to the second embodiment includes a transmitting part 28 having a clutch 58 (see FIG. 5) which is configured to be switched between a connection state and a disconnection state, the connection state being a state where the clutch 58 performs a transmission of a torque between a gear mechanism 26 and a drum 20, specifically between a speed reducer 56 and the drum 20, the disconnection state being a state where the clutch 58 suspends the transmission of the torque therebetween.

Specifically, as illustrated in FIG. 5, in the second embodiment, the speed reducer 56 is arranged in an inside of a drum body 40 at a position closer to first and second motors 22, 24 than the speed reducer 56 of the first embodiment. This configuration can ensure a sufficient space in the inside of the drum body 40 on one side of the speed reducer 56 that is opposite to the other side of the speed reducer 56 where the first and second electric motors 22, 24 lie, and the space is utilized to place the clutch 58 therein. In other words, the clutch 58 is arranged on the one side of the speed reducer 56, in the axial direction of the drum 20, that is opposite to the other side of the speed reducer 56 where the first and second motors 22, 24 lies, and arranged in the inside of the drum body 40.

For example, a wet clutch constitutes the clutch 58. The clutch 58 has one clutch plate to rotate integrally with an unillustrated output shaft of the speed reducer 56, the other clutch plate to rotate integrally with the drum body 40, and a switcher which switches over an engagement state where the clutch plates engage with each other, and a disengagement state where the clutch plates disengage from each other. However, the one clutch plate, the other clutch plate, and the switcher of the clutch 58 are unillustrated. The clutch 58 switches to a connection state where the clutch 58 performs a torque transmission between the speed reducer 56 and the drum body 40 in accordance with an operation of the switcher to make the clutch plates come into the engagement state. Alternately, the clutch 58 switches to a disconnection state where the clutch 58 suspends the torque transmission between the speed reducer 56 and the drum body 40 by disconnecting the speed reducer 56 from the drum body 40 in accordance with an operation of the switcher to make the clutch plates come into the disengagement state.

The clutch 58 is controlled by a controller 68 (see FIG. 6) of the control system. Specifically, the controller 68 sends a control signal to the switcher of the clutch 58, and the switcher switches over the engagement state and the disengagement state of the clutch plates in response to the control signal.

The electric winch device 1 according to the second embodiment has the same configuration as the electric winch device 1 of the first embodiment except for the above-described configuration.

In the electric winch device 1 according to the second embodiment, because of the switching of the clutch 58 from the connection state to the disconnection state, the drum 20 is disconnected from the speed reducer 56, and the gear mechanism 26 and the motors 22, 24 connected thereto, and allowed to freely rotate. As a result, a free fall of the hook device 12 (see FIG. 1) is permitted.

Also, in the second embodiment, the size of the electric winch device 1 can be reduced owing to the arrangement of the clutch 58 in the inside of the drum body 40 in comparison with a case where a clutch is arranged outside a drum.

Moreover, in the second embodiment, the clutch 58 is arranged on one side of the speed reducer 56, in the axial direction of the drum 20, that is opposite to the other side of the speed reducer 56 where the motors 22, 24 lie. Hence, it is possible to arrange a cooling system to cool the clutch 58 and electric cables to the clutch 58 without interfering with an arrangement of a cooling system and electric cables to the motors 22, 24. This configuration enables an easy arrangement of the cooling system and electric cables to the clutch 58.

The above-described embodiments merely show examples in all the aspects, and thus should not be considered to be limited. The scope of the invention should be defined by the scope of claims, not the description of the above-described embodiments, and further cover meanings equivalent to those readable in the scope of claims and all the changes falling within the scope of the claims.

Figure 7:
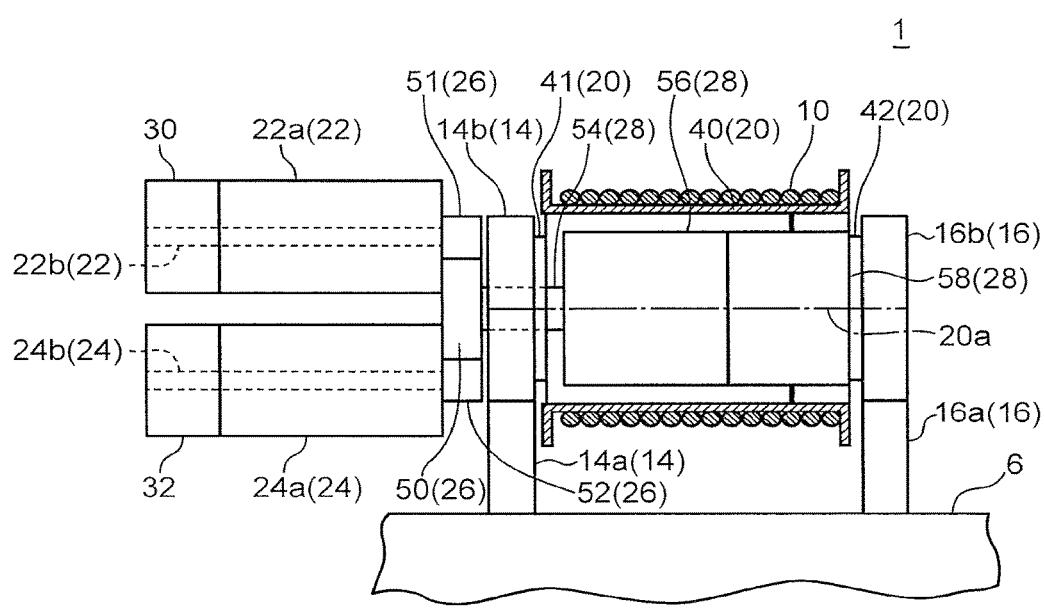
FIG. 7 is a view illustrating a modification of the electric winch device of the present invention, similar to FIG. 2.
Figure 8:
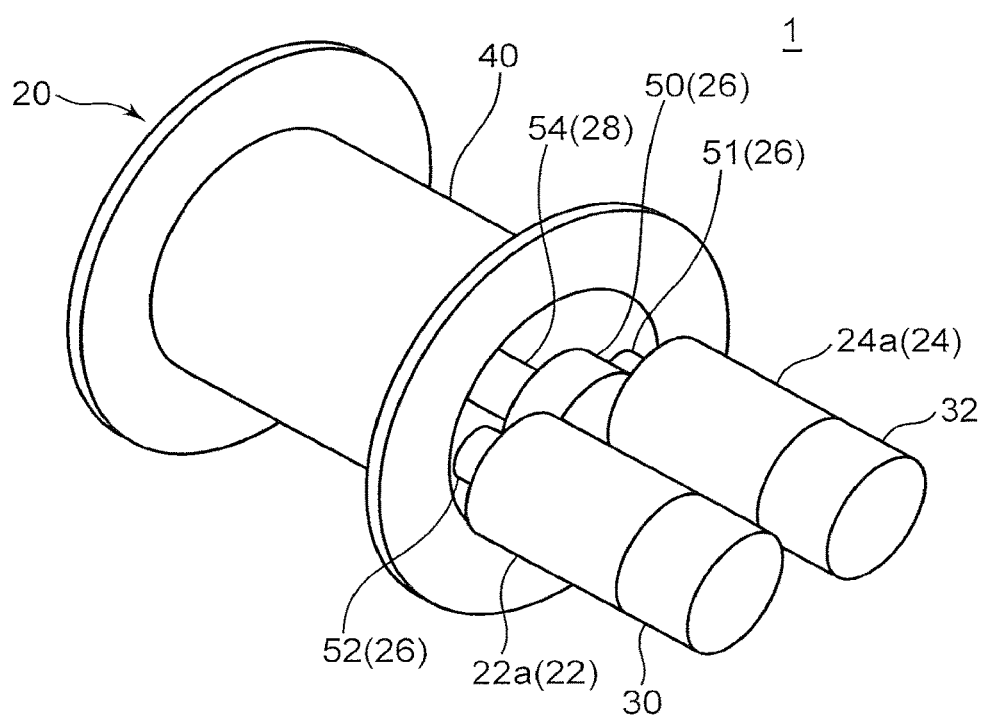
FIG. 8 is a view illustrating the modification of the electric winch device of the present invention illustrated in FIG. 7, similar to FIG. 3.

For example, a modification illustrated in FIGS. 7 and 8 may be appreciated, in which a first brake 30 is arranged on one side of a first motor body 22a that is opposite to the other side of the first motor body 22a where the drum 20 lies, and fixedly attached to the first motor body 22a. In other words, the first brake 30 is arranged on the one side of the first motor body 22a that is opposite to the other side of the first motor body 22a where a gear mechanism 26 lies, and fixedly attached to the first motor body 22a. In this case, a first drive shaft 22b protrudes from one end of the first motor body 22a that is opposite to the other end located closer to the gear mechanism 26, whereby permitting the first brake 30 to apply a braking force to the protruded extension of the first drive shaft 22b.

Also, a second brake 32 may be appreciated to be arranged on one side of a second motor body 24a that is opposite to the other side of the second motor body 24a where the drum 20 lies, and fixedly attached to the second motor body 24a. In other words, the second brake 32 is arranged on the one side of the second motor body 24a that is opposite to the other side of the second motor body 24a where the gear mechanism 26 lies, and fixedly attached to the second motor body 24a. In this case, a second drive shaft 24b protrudes from one end of the second drive shaft 24b that is opposite to the other end located closer to the gear mechanism 26, whereby permitting the second brake 32 to apply a braking force to the protruded extension of the second drive shaft 22b.

Moreover, in the electric winch device, the number of motors located on one side of a drum in an axial direction of the drum may not be limited to two. Specifically, three or more motors may be located on the one side of the drum in the axial direction thereof.

Figure 9:
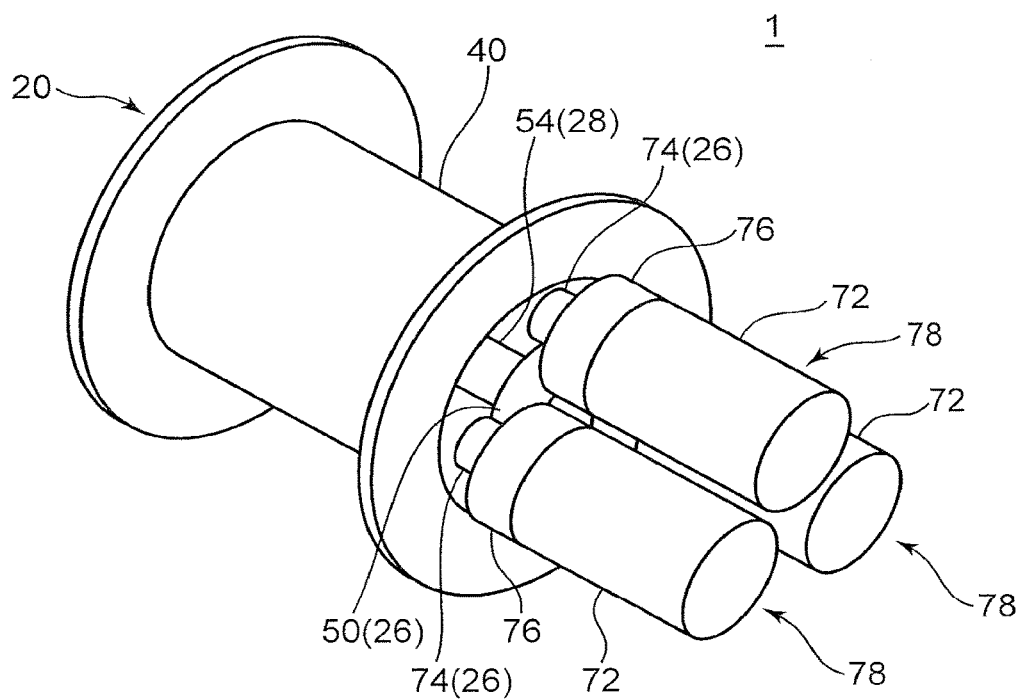
FIG. 9 is a view illustrating another modification of the electric winch device of the present invention, similar to FIG. 3.

FIG. 9 illustrates another modification of the electric winch device 1 that includes three motors 72 arranged on one side of a drum 20 in an axial direction of the drum 20. In this case, it may appreciated to provide three assemblies 78 around a center gear 50, the assemblies 78 each including a motor 72, a gear 74 coupled to a drive shaft of the motor 72 to rotate integrally therewith, and a brake 76 which applies a braking force to the drive shaft. Further, the gear 74 in each of the assemblies 78 is meshed with the center gear 50. The motor 72 has the same configuration as the first and second motors 22, 24 of the first embodiment, the gear 74 has the same configuration as the first and second gears 51, 52 of the first embodiment, and the brake 76 has the same configuration as the first and second brakes 30, 32 of the first embodiment.

Alternatively, four or more assemblies 78 may be arranged around the center gear 50 in the same manner.

In these modifications, the brake 76 may be arranged on one side of a motor body that is opposite to the other side of the motor body where the drum 20 lies in the same manner as the modification illustrated in FIGS. 7 and 8.

As described above, a larger number of motors 72 can apply a greater torque to the drum 20. Also, in each of the modifications, all the motors 72 included in the electric winch device 1 are located only on the one side of the drum 20 in the axial direction of the drum 20, and arranged side by side in a direction perpendicular to the axial direction of the drum 20. This configuration makes it possible to prevent an increase in the dimension of the electric winch device 1 in the axial direction of the drum 20, and further satisfy a width limitation of an upper slewing body 4.

In the present invention, however, the electric winch device should not be limited to one including motors located only on one side of a drum in an axial direction of the drum.

Figure 10:
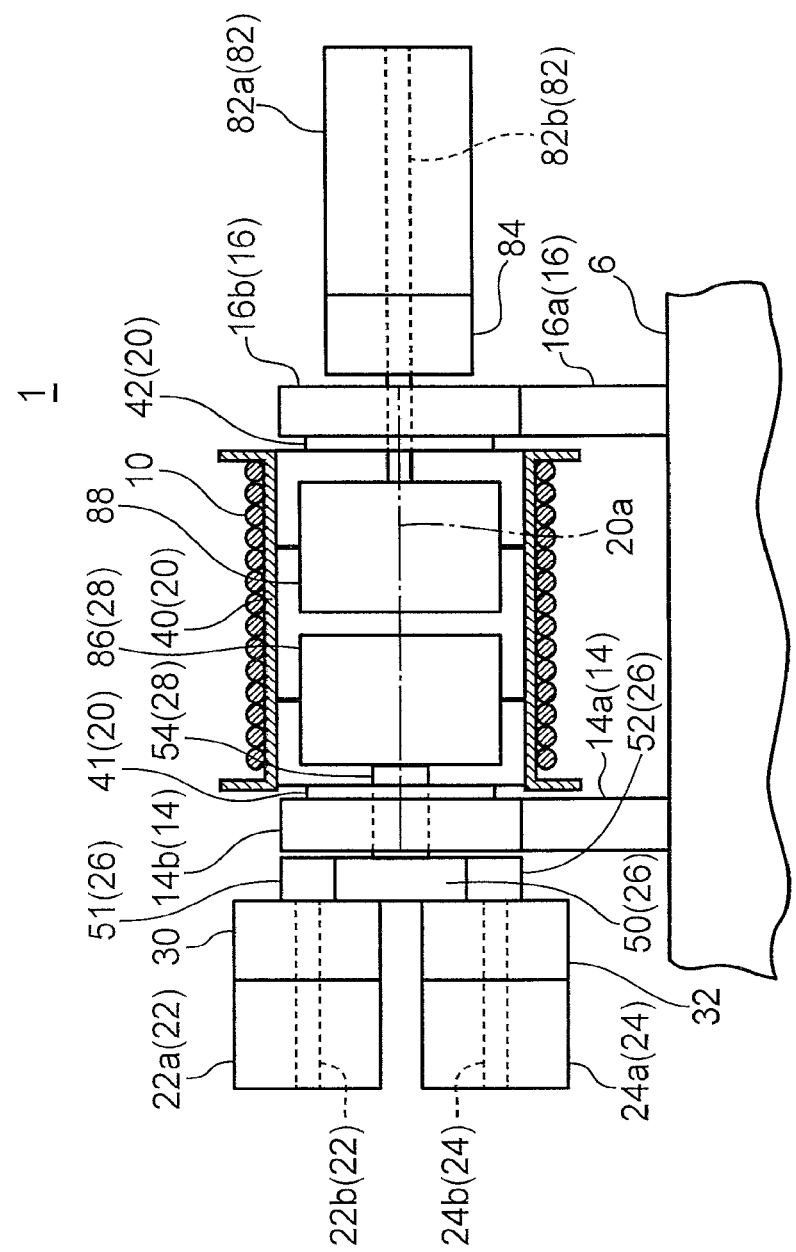
FIG. 10 is a view illustrating further another modification of the electric winch device of the present invention, similar to FIG. 2.

For example, a further another modification illustrated in FIG. 10 may be appreciated, in which an electric winch device 1 includes a first and second motors 22, 24 located on one side of a drum 20, in an axial direction of the drum 20, where a first standing support 14 lies, and additionally a third motor 82 arranged on the other side of the drum 20 in the axial direction of the drum 20, where a second standing support 16 lies.

The third motor 82 has a third motor body 82a and a third drive shaft 82b, the third motor body 82b being arranged on one side of the second standing support 16, in the axial direction of the drum 20, that is opposite to the other side of the second standing support 16 where the drum 20 lies, and the third drive shaft 82b extending from the third motor body 82a to an inside of a drum body 40 through a second shaft 42. The third motor body 82a has the same configuration as the first motor body 22a of the first embodiment. The third drive shaft 82b is coaxial with the drum 20.

The third motor body 82a is provided with a third brake 84 arranged on one side of the third motor body 82a where the second standing support 16 lies. The third brake 84 is fixedly attached to the third motor body 82a. The third brake 84 applies a braking force to an extension of the third drive shaft 82b that protrudes from the third motor body 82a toward the drum 20.

The drum body 40 accommodates a first speed reducer 86 and a second speed reducer 88 in the inside thereof, the first speed reducer 86 being provided in a transmitting part 28 which transmits a resultant of torques combined by a gear mechanism 26 to the drum body 40, and the second speed reducer 88 having an input portion connected with the third drive shaft 82b.

The first speed reducer 86 has the same configuration as the speed reducer 56 of the first embodiment except that the first speed reducer 86 is arranged closer to the first standing support 14 than the speed reducer 56.

The second speed reducer 88 is arranged side by side with the first speed reducer 86 in the axial direction of the drum 20 in the inside of the drum body 40, and arranged on one side of the first speed reducer 86 where the second standing support 16 lies. The second speed reducer 88 has an output portion connected to the drum body 40. The second speed reducer 88 rotates the drum body 40, i.e., the drum 20, at a rotational speed to which the rotational speed of the third drive shaft 82b has been reduced at a predetermined speed reduction ratio.

Moreover, in the modification illustrated in FIG. 10, each of the first and second motor bodies 22a, 24a has a smaller axial length than the first and second motor bodies 22a, 24a of the first embodiment. Specifically, each of the first and second motor bodies 22a, 24 of the modification has a smaller axial length which is around a half of the axial length of the first and second motor bodies 22a, 24a of the first embodiment. The arrangement of the third motor 82 and the third brake 84 on the side where the standing support 16 lies may lead to an increased dimension of the electric winch device 1 in the axial direction of the drum 20. However, owing to the above-described smaller length of each of the first and second motor bodies 22a, 24, it is possible to suppress an excessive increase in the size of the electric winch device 1.

Besides, generally, a motor outputs a torque which is proportional to an axial length of a motor body. Hence, the first motor 22 of the modification illustrated in FIG. 10 outputs a smaller torque than the first motor 22 of the first embodiment. Similarly, the second motor 24 of the modification outputs a smaller torque than the second motor 24 of the first embodiment. However, the third motor 82 can generate more than the decreased output torques. Therefore, the modification illustrated in FIG. 10 makes it possible to enhance the hoisting performance of the electric winch device 1.

Figure 11:
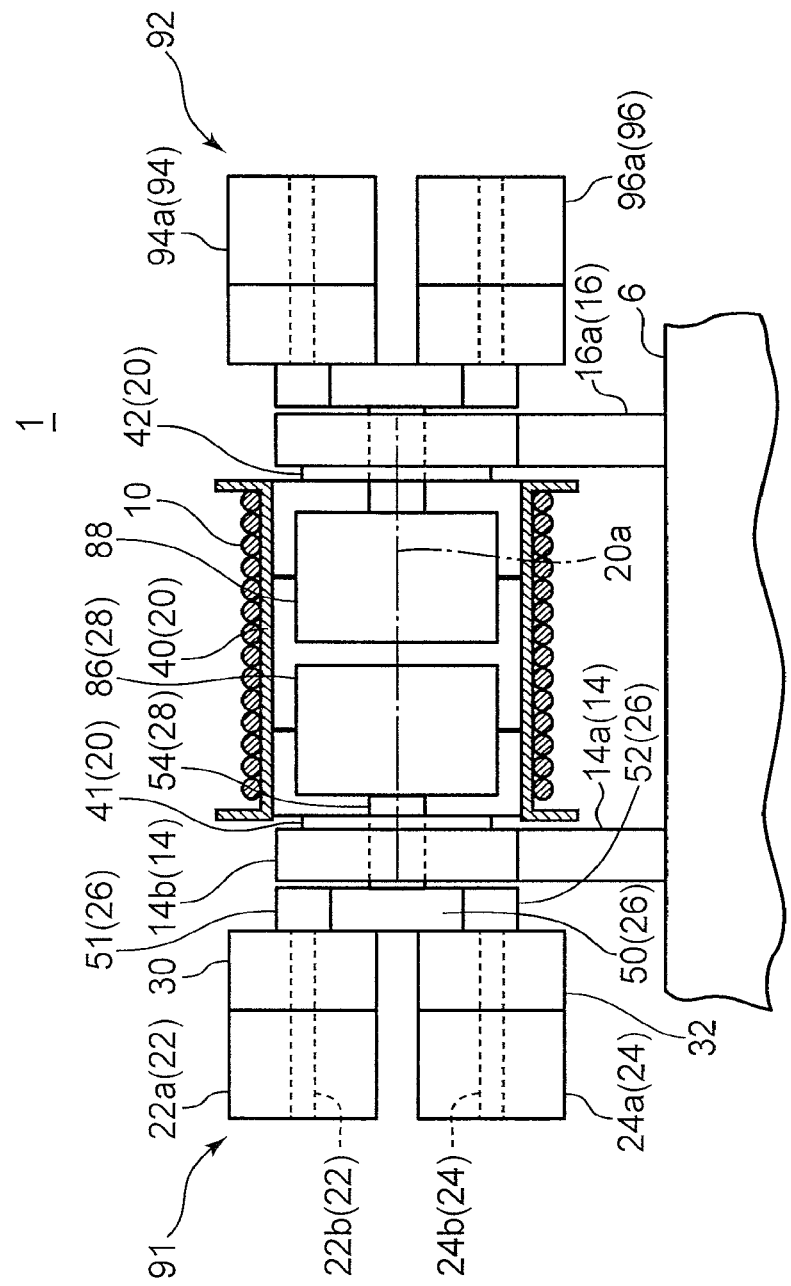
FIG. 11 is a view illustrating still further another modification of the electric winch device of the present invention, similar to FIG. 2.

Additionally, still another modification illustrated in FIG. 11 may be provided with a first assembly 91 and a second assembly 92 having the same configuration as the first assembly 91. The first and second assemblies 91, 92 are symmetrically arranged with each other, specifically on one side of the drum 20, in the axial direction of the drum 20, where the first standing support 14 lies, and on the other side of the drum 20 where the second standing support 16 lies. Each of the first and second assemblies 91, 92 includes a first motor 22, a first brake 30, a second motor 24, a second brake 32, a gear mechanism 26, and a transmitting part 28. In this modification, each of the first and second assemblies 91, 92 has the same configuration as the assembly of the modification illustrated in FIG. 10 that includes the first motor 22, the first brake 30, the second motor 24, the second brake 32, the gear mechanism 26, and the transmitting part 28.

Further, in this modification, the second assembly 92 arranged on the side where the second standing support 16 lies includes two motor bodies 94a, 96a each having a smaller axial length than the third motor body 82a of the modification illustrated in FIG. 10. Hence, this modification makes it possible to reduce the dimension of the electric winch device 1 in the axial direction of the drum 20 in comparison with the modification illustrated in FIG. 10.

In this modification, each of the motors 94, 96 in the second assembly 92 outputs a smaller torque than the third motor 82 of the modification illustrated in FIG. 10. However, this modification includes a larger number of motors, i.e., the motors, 94, 96, than the modification illustrated in FIG. 10, and hence can ensure a sufficient torque equivalent to that of the modification illustrated in FIG. 10 or more as a torque to be applied from the second assembly 92 to the drum 20.

Besides, a clutch may not be necessarily provided between a speed reducer and a drum in a transmitting part which performs a torque transmission between a gear mechanism and the drum. For example, a clutch may be provided between the gear mechanism and the speed reducer.

Additionally, the present invention should not be limited to an electric winch device of the winding type that is operative to perform an operation of raising and lowering a target object. For example, the present invention may be applied to an electric winch device of the tilting type that tilts a tilting member such as a boom.

Figure 12:
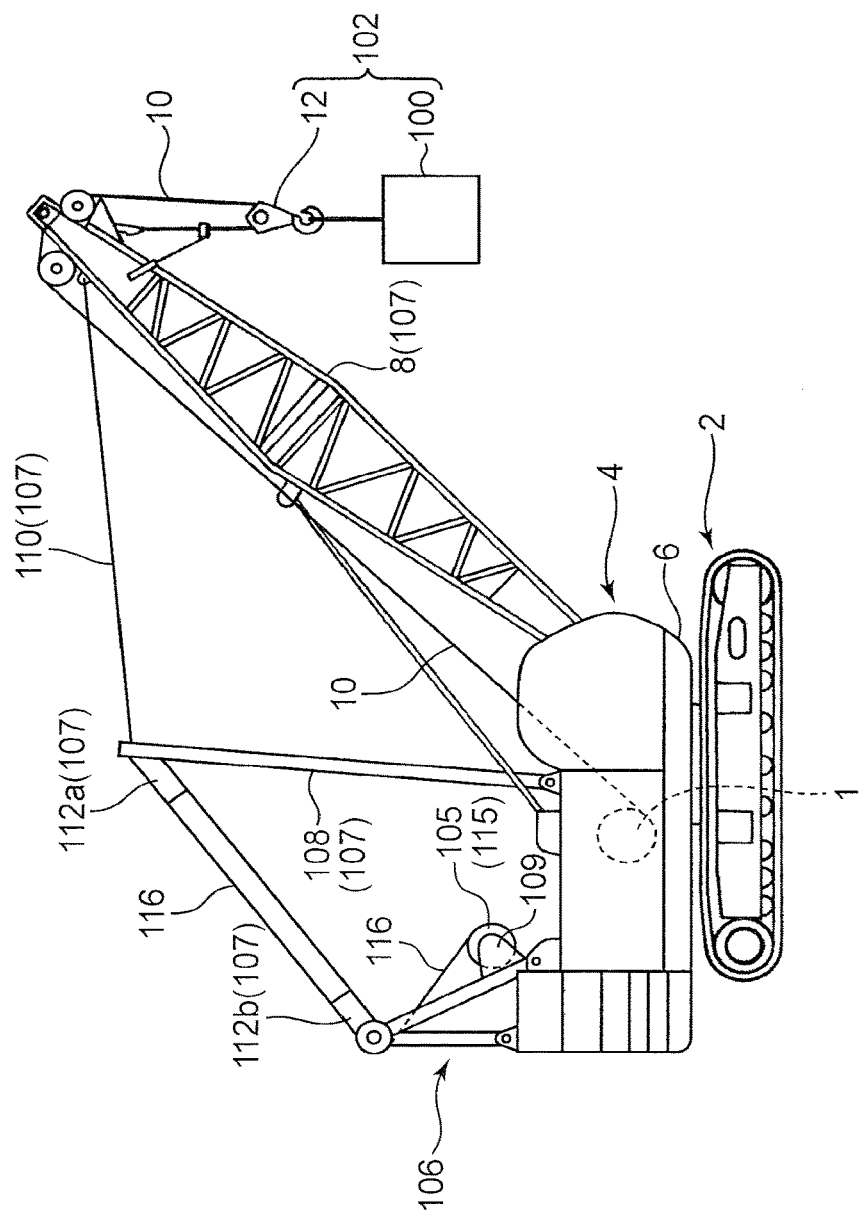
FIG. 12 is a schematic view illustrating a mobile crane which is mounted with a modified electric winch device of the tilting type according to the present invention.

FIG. 12 schematically illustrates a configuration of a mobile crane mounted with an electric winch device 105 of the tilting type that is a modification of the present invention. The mobile crane includes an upper slewing body 4 provided with a gantry 106 standing at a rear portion thereof. Further, the mobile crane includes a tilting device 107 for a hoisting operative section.

The tilting device 107 includes a boom 8 serving as a tilting member, a mast 108, a guy line 110, a mast spreader 112a, and a gantry spreader 112b.

The mast 108 is disposed in an intermediate position in the front and rear direction of the upper slewing body 4 and pivotable about an axis extending in the width direction of the upper slewing body 4. The guy line 110 connects the top end of the mast 108 and the top end of the boom 8 with each other.

The mast spreader 112a is provided at a top end of the mast 108, and the gantry spreader 112b is provided at a top end of the gantry 106.

The electric winch device 105 is arranged at a location close to a base portion of the gantry 106. Specifically, a pair of support base parts 109, which are identical to the first and second base parts 14a, 16a, are attached to the gantry 106 at the location close to the base portion thereof while defining a space therebetween in the width direction of the upper slewing body 4. The pair of support base parts 109 respectively retain unillustrated bearing parts, which are identical to the first and second bearing parts 14b, 16b. The unillustrated bearing parts rotatably support a shaft of a winch drum 115 (hereinafter, referred to as "drum 115") provided in the electric winch device 105. The drum 115 is arranged in such a manner that the axial direction thereof is along the width direction of the upper slewing body 4.

The drum 115 is wound with a tilt rope 116 therearound. The tilt rope 116 pulled out from the drum 115 extends through the gantry spreader 112b and the mast spreader 112a. The drum 115 is rotated to wind up and let out the tilt rope 116, thereby causing the tilting device 107 to tilt the boom 8 upward and downward for hoisting work.

Specifically, the drum 115 is rotated to wind up the tilt rope 116 and pull the mast spreader 112a toward the gantry spreader 112b, thereby pivotally moving the mast 108 rearward and further pulling the top end of the boom 8 rearward via the guy line 110. In this manner, the boom 8 gradually stands while pivotally moving rearward. Alternately, the drum 115 is rotated to let out the tilt rope 116, thereby allowing the mast spreader 112a to move forward and away from the gantry spreader 112b. In this manner, the boom 8 is pivotally tilted forward with the support of the mast 108 via the guy line 110.

The electric winch device 105 of the tilting type has the same configuration as the electric winch device 1 except for the above-described configuration. Hence, this modification also can bring about the same advantageous effect as the electric winch device 1.

Additionally, the present invention should not be limited to a mobile crane of the crawler type. For example, the present invention is applicable to a wheel crane having a lower travelling body of the wheel type.

Summary of Embodiments

The embodiments will be summarized in the following manners.

An electric winch device according to the embodiment is an electric winch device which is to be mounted on a mobile crane including an operative part for hoisting work to cause the operative part to perform an operation for the hoisting work by winding up or letting out a rope connected to the operative part, the electric winch device comprising: a winch drum having an axis, the winch drum being provided on the mobile crane to be rotatable about the axis and being wound with the rope therearound; a plurality of motors located on one side of the winch drum in an axial direction in which the axis of the winch drum extends, and arranged side by side in a direction perpendicular to the axial direction of the winch drum; a gear mechanism which combines torques output from the plurality of motors; and a transmitting part which transmits a resultant of torques combined by the gear mechanism to the winch drum to rotate the winch drum to thereby cause the winch drum to wind up or let out the rope.

In the electric winch device, the gear mechanism combines the torques output from the plurality of motors, and the transmitting part transmits the resultant of torques combined by the gear mechanism to the winch drum. Therefore, it is possible to rotate the drum winch by a sufficient torque. Accordingly, the electric winch device can assure a sufficient hoisting performance of the electric winch device. Moreover, in the electric winch device, the plurality of motors are located on the one side of the winch drum in the axial direction of the winch drum, and arranged side by side in the direction perpendicular to the axial direction of the winch drum. Hence, the dimension of the electric winch device in the axial direction of the winch drum can be reduced in comparison with an assumed case where the plurality of motors are arranged on the opposite sides of the winch drum in the axial direction thereof. Accordingly, in the state that the electric winch device is mounted on the mobile crane, it is possible to satisfy the dimensional restriction for the mobile crane without excessively increasing the size of the mobile crane.

The electric winch device preferably has no motor other than the plurality of motors.

In this configuration, all the motors included in the electric winch device are located only on the one side of the winch drum in the axial direction of the winch drum. Hence, the dimension of the electric winch device in the axial direction of the winch drum can be reduced even in a case where the electric winch device includes a larger number of motors.

In the electric winch device, the transmitting part preferably includes a clutch which is configured to be switched between a connection state and a disconnection state, the connection state being a state where the clutch performs a transmission of a torque between the gear mechanism and the winch drum, the disconnection state being a state where the clutch disconnects the gear mechanism from the winch drum to suspend the transmission of the torque between the gear mechanism and the winch drum.

In this configuration, because of the switching of the clutch to the disconnection state, the winch drum is disconnected from the gear mechanism and the motors connected thereto, and allowed to freely rotate. As a result, a free fall of the target object is permitted.

In the electric winch device, it is preferred that the gear mechanism includes an outputting member which is configured to be rotated owing to the resultant of torques output from the plurality of motors, and the transmitting part includes a speed reducer which causes the winch drum to rotate at a lower rotational speed than a rotational speed of the outputting member.

This configuration makes it possible to rotate the winch drum at a lower rotational speed than the rotational speed of the outputting member of the gear mechanism. Further, in this configuration, the size of the electric winch device can be reduced owing to the arrangement of the speed reducer in the inside of the winch drum in comparison with a case where the speed reducer is arranged outside the winch drum.

In this case, it is preferred that the transmitting part includes a clutch which is configured to be switched between a connection state and a disconnection state, the connection state being a state where the clutch performs a transmission of a torque between the speed reducer and the winch drum, the disconnection state being a state where the clutch disconnects the speed reducer from the winch drum to suspend the transmission of the torque between the speed reducer and the winch drum, and the clutch is located at an opposite side of the motor across the speed reducer in the axial direction of the winch drum, and arranged in an inside of the winch drum.

In this configuration, because of the switching of the clutch to the disconnection state, the winch drum is disconnected from the gear mechanism and the motors connected thereto, and allowed to freely rotate. As a result, a free fall of the target object is permitted. Moreover, in this configuration, the size of the electric winch device can be reduced owing to the arrangement of the clutch in the inside of the winch drum in comparison with a case where the clutch is arranged outside. Furthermore, the clutch is arranged on the one side of the speed reducer, in the axial direction of the winch drum, that is opposite to the other side of the speed reducer where the motors are arranged. Hence, it is possible to arrange a cooling system to cool the clutch and electric cables to the clutch without interfering with an arrangement of a cooling system and electric cables to the motors. This configuration enables an easy arrangement of the cooling system and wires to the clutch.

In the electric winch device, it is preferred that each of the plurality of motors includes a drive shaft connected to the gear mechanism, and a motor main body which rotates the drive shaft, the gear mechanism and the transmitting part are configured to increase the torque of the drive shaft and transmit the increased torque to the winch drum, and the electric winch device further comprises a plurality of brakes for each applying a braking force to the corresponding drive shaft of each of the plurality of motors.

In this configuration, each of the brakes can brake the rotation of the winch drum by applying the braking force to the drive shaft of the corresponding motor. Moreover, in this configuration including the plurality of brakes, even if one of the brakes cannot generate the braking force due to a failure, the other brake can keep the braking force. Therefore, it is possible to ensure an increased reliability in the braking of the rotation of the winch drum. Besides, in this configuration, the gear mechanism and the transmitting part transmit the torques of the drive shafts of the motors to the drum after increments. The brakes apply the braking forces to the shafts of the motors which are located at a starting position of a torque transmission sequence. Hence, the brakes can brake the rotation of the winch drum at smaller braking forces. In other words, it is sufficient for the brakes to generate smaller braking forces to brake the rotation of the winch drum. This makes it possible to use the brakes each having a smaller size and a smaller braking capability, and thus can prevent an increase in the size of the electric winch device due to the provision of the brakes.

A mobile crane according to the present invention includes the electric winch device.

The mobile crane mounted with the electric winch device can assure a sufficient hoisting performance and satisfy the dimensional restriction.

As described above, according to the embodiments, it is possible to provide an electric winch device and a mobile crane which can assure a sufficient hoisting performance and satisfy the dimensional restriction for the mobile crane.

The invention claimed is:

1. An electric winch device which is to be mounted on a mobile crane including an operative part for hoisting work to cause the operative part to perform an operation for the hoisting work by winding up or letting out a rope connected to the operative part, the electric winch device comprising:
    a winch drum having an axis, the winch drum being provided on the mobile crane to be rotatable about the axis and being wound with the rope therearound;
    a plurality of motors located on one side of the winch drum in an axial direction in which the axis of the winch drum extends, and arranged side by side in a direction perpendicular to the axial direction of the winch drum;
    a gear mechanism which combines torques output from the plurality of motors; and
    a transmitting part which transmits a resultant of torques combined by the gear mechanism to the winch drum to rotate the winch drum to thereby cause the winch drum to wind up or let out the rope, wherein
    the gear mechanism includes an outputting member which is configured to be rotated owing to the resultant of torques output from the plurality of motors, and
    the transmitting part includes a speed reducer which causes the winch drum to rotate at a lower rotational speed than a rotational speed of the outputting member,
    each of the plurality of motors has a drive shaft which serves as an output shaft for the torque, the gear mechanism further includes a plurality of gears, each of the plurality of gears being coupled to a corresponding one of the drive shafts of the plurality of motors to rotate integrally with the corresponding one of the drive shafts,
    the outputting member is a center gear which is meshed with each of the plurality of gears to combine the torques of the drive shafts to rotate owing to a resultant torque which is a combined torque of the drive shafts,
    the transmitting part further includes a transmission shaft configured to be integrally rotatable with the center gear, and
    the speed reducer is connected with the transmission shaft to receive an input of the rotation of the transmission shaft and configured to rotate the winch drum at a reduced rotational speed to which the rotational speed of the transmission shaft has been reduced at a predetermined speed reduction ratio, wherein at least one of the transmission shaft and the speed reducer is located within the winch drum.

2. The electric winch device according to claim 1, which has no motor other than the plurality of motors.

3. The electric winch device according to claim 1, wherein the transmitting part includes a clutch which is configured to be switched between a connection state and a disconnection state, the connection state being a state where the clutch performs a transmission of a torque between the gear mechanism and the winch drum, the disconnection state being a state where the clutch disconnects the gear mechanism from the winch drum to suspend the transmission of the torque between the gear mechanism and the winch drum.

4. The electric winch device according to claim 1, wherein the transmitting part includes a clutch which is configured to be switched between a connection state and a disconnection state, the connection state being a state where the clutch performs a transmission of a torque between the speed reducer and the winch drum, the disconnection state being a state where the clutch disconnects the speed reducer from the winch drum to suspend the transmission of the torque between the speed reducer and the winch drum, and the clutch is located at an opposite side of the motor across the speed reducer in the axial direction of the winch drum, and arranged in an inside of the winch drum.

5. An electric winch device which is to be mounted on a mobile crane including an operative part for hoisting work to cause the operative part to perform an operation for the hoisting work by winding up or letting out a rope connected to the operative part, the electric winch device comprising:

a winch drum having an axis, the winch drum being provided on the mobile crane to be rotatable about the axis and being wound with the rope therearound;

a plurality of motors located on one side of the winch drum in an axial direction in which the axis of the winch drum extends, and arranged side by side in a direction perpendicular to the axial direction of the winch drum;

a gear mechanism which combines torques output from the plurality of motors; and a transmitting part which transmits a resultant of torques combined by the gear mechanism to the winch drum to rotate the winch drum to thereby cause the winch drum to wind up or let out the rope, wherein each of the plurality of motors includes a drive shaft connected to the gear mechanism, and a motor main body which rotates the drive shaft, the gear mechanism and the transmitting part are configured to increase the torque of the drive shaft and transmit the increased torque to the winch drum, and the electric winch device further comprises a plurality of brakes for each applying a braking force to the corresponding drive shaft of each of the plurality of motors, and wherein the gear mechanism includes an outputting member which is configured to be rotated owing to the resultant of torques output from the plurality of motors, the transmitting part includes a speed reducer which causes the winch drum to rotate at a lower rotational speed than a rotational speed of the outputting member, the outputting member is a center gear which is meshed with each of plurality of gears of the gear mechanism to combine the torques of the drive shafts to rotate owing to a resultant torque which is a combined torque of the drive shafts, the transmitting part further includes a transmission shaft configured to be integrally rotatable with the center gear, and at least one of the transmission shaft and the speed reducer is located within the winch drum.

6. A mobile crane, comprising:
the electric winch device according to claim 1.

* * * * *